United States Patent [19]

Ballman

[11] 4,399,394
[45] Aug. 16, 1983

[54] ELECTRONIC MOTOR START SWITCH

[76] Inventor: Gray C. Ballman, 30 Portland Dr., Frontenac, Mo. 63131

[21] Appl. No.: 317,150

[22] Filed: Nov. 2, 1981

[51] Int. Cl.³ .............................................. H02P 1/44
[52] U.S. Cl. .................................... 318/786; 318/817
[58] Field of Search ........................ 318/786, 751–753, 318/756, 816, 817

[56] References Cited

U.S. PATENT DOCUMENTS 3,777,232 12/1973 Woods et al. ........................ 318/786
3,819,994 6/1974 Ballman .............................. 318/786

Primary Examiner—David Smith, Jr.
Attorney, Agent, or Firm—Rogers, Eilers & Howell

[57] ABSTRACT

An electronic circuit for automatically disconnecting a start winding of an electric motor after a predetermined time delay is suitable for use in instantly reversing applications and provides timed disconnection of the start winding upon substantially instantaneous reconnection of the motor for reverse rotation. The circuit includes a triac and full wave bridge, the full wave bridge providing full wave rectified D-C to a timing circuit and a resetting circuit. The resetting circuit utilizes a PUT which switches at the gate lead of an SCR in the timing circuit to de-energize it and permit discharge of the timing voltage accumulated during a timed start cycle. A capacitor and resistor in series with the PUT maintain the current therethrough to prevent turn-off during the valley portion of the rectified D-C supply. The entire circuit may be conveniently mounted on a small PC board which fits into the capacitor conduit box mounted to the motor housing, with quick disconnect terminals providing easy installation, maintenance and trouble shooting.

9 Claims, 1 Drawing Figure

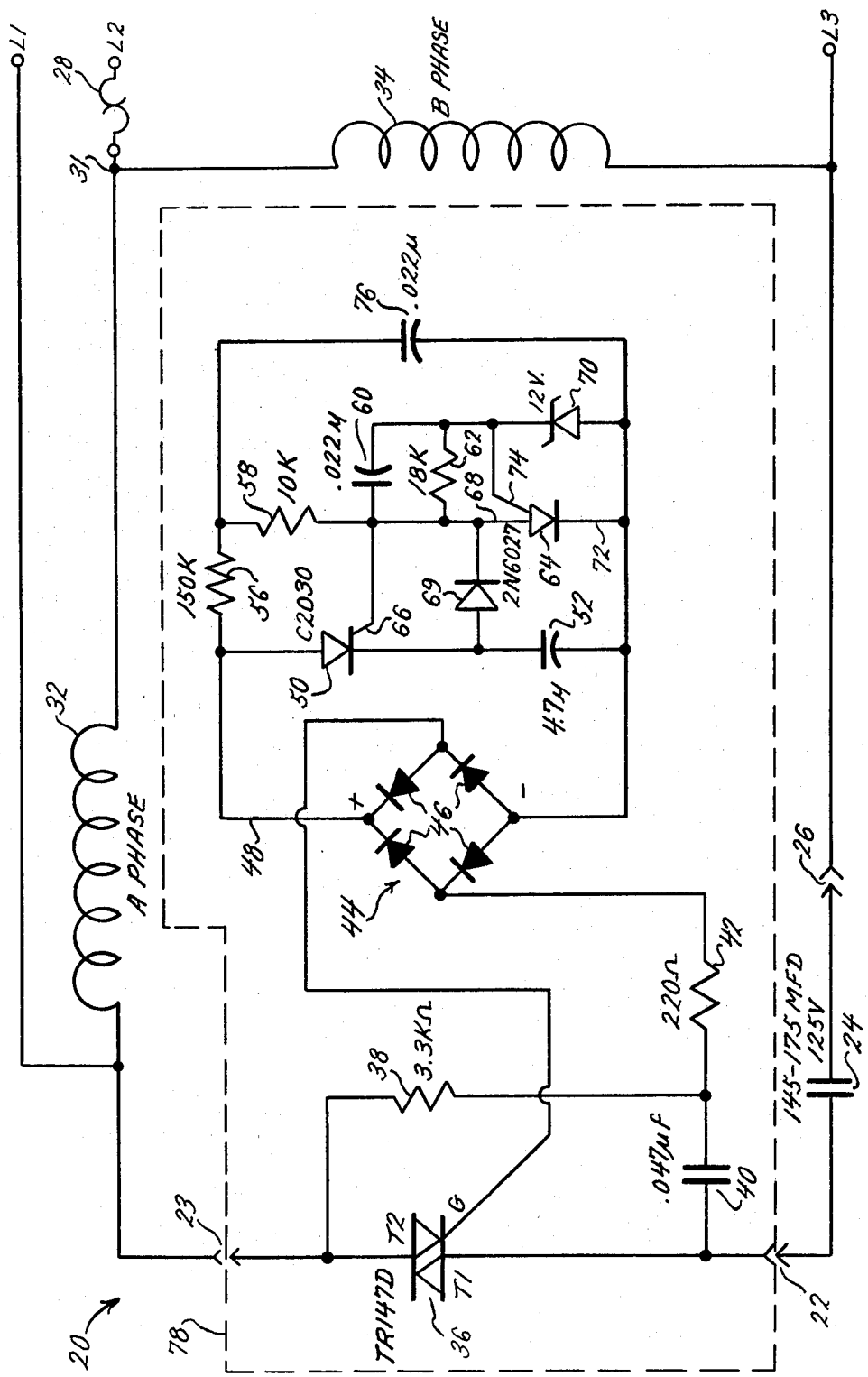

ELECTRONIC MOTOR START SWITCH

BACKGROUND AND SUMMARY

Smaller horsepower A-C motors generally have both a start winding and a run winding, the start winding being connected only until the motor aproaches its rated speed at which point a switch of some kind is generally provided to disconnect it. The first of these were generally mechanically operated centrifugal type switches which suffered from many disadvantages, including burnt contacts, misalignment and adjustment problems through wear and the like. With the advent of electronic technology, electronic circuits were designed and developed using transistors, SCRs, and triacs to switch the run winding out of the circuit after a timed interval. Generally, a capacitor was provided with a charging resistor with an adjustable time constant to vary the time delay. Other schemes were also designed and developed which used variations of this approach. Some were more sophisticated than others, and provided additional advantages not found in other approaches. Some of these prior art patents are U.S. Pat. No. 3,519,911; 3,746,951; 3,414,789; 3,258,668; and 3,533,048.

The inventor herein is himself the inventor of two prior such switches which were unique in providing advantages not found in the prior art. These prior patents are U.S. Pat. No. 3,819,994 and U.S. Pat. No. 3,819,995, both issued June 25, 1974.

Typically, these prior art patents disclose circuits which achieve their intended function of switching the start winding out of circuit after a predetermined time, but they do not provide for the important function of re-initiating the timed disconnection of the start winding upon substantially instantaneous reconnection of the motor for reverse rotation. This is generally referred to as instantaneous reversal or "instantly reversing" and is often encountered in small A-C motor applications. Some of these include garage door motors, electric hospital bed, and other situations where for ease of operation, or safety, it is important to very quickly change the direction of rotation of the motor and the direction of movement of its connected load.

Some of the circuits in the prior art are ineffective for instantly reversing applications as the capacitor or other element being used to time the switching remains in a fully charged condition and needs time to deplete its charge before it may be reconnected and provide a period of delay in the opposite direction. Alternatively, some circuits do discharge the timing capacitor or other circuit element and ready it for reconnection, but these circuits generally are polarity sensitive and require that an additional circuit be provided which doubles the cost and increases the likelihood of circuit failure, difficulty in trouble shooting, and size of the switch. As can be appreciated, cost can be a significant factor as these start switches are generally provided in a very competitive market of low horsepower A-C motors and which are produced in large quantities for consumer products and the like. Elimination of one circuit element can provide such a significant cost savings as to be the deciding factor in many applications.

To solve these and other problems, applicant has succeeded in developing an elegantly simple motor start switch which is insensitive to the polarity of its connection and which can be used to provide timed disconnection of a start winding in those instantly reversing applications requiring that feature. Applicant's circuit can be readily mounted on a small PC board with plug-in connectors suitable for rapid installation to the capacitor in the enclosure mounted to the top of the bell housing of a typical small horsepower capacitor start A-C motor. Applicant's circuit includes a bi-directional triac which is polarity insensitive for switching the start winding, a full wave bridge rectifier for ensuring equivalent circuit performance in either direction, fully adjustable timed switching through a timing capacitor charged by a SCR, with the switching of the SCR determined by a programmable unijunction transistor (PUT), the PUT having an adjustable switching point by changing the value of a zener diode or capacitance value of the timing circuit, and a latching circuit to hold the PUT in conduction during the low voltage portions of the full wave rectified waveform, while permitting rapid turn-off with either of two circuit mechanisms within a matter of 16.4 milliseconds to set up the switch for another timed operation. As can be appreciated, the low voltage portions of a full wave rectified waveform can be completely accommodated for by "latching" the PUT in an energized condition during the less than nine milliseconds between peak values. This value probably represents the minimum off time which must be ignored until the PUT may be permitted to switch off and thereby set up the circuit for reconnection. Applicant's design approaches this minimum value and is well within the time periods required to achieve the mechanical switching of the electrical control which connects and disconnects the windings of the motor.

A more complete understanding of applicant's invention may be attained through a review of the drawing and the following description of the preferred embodiment.

BRIEF DESCRIPTION OF THE DRAWING

FIG. 1 is a schematic diagram of applicant's instant reversing switch.

DETAILED DESCRIPTION OF THE PREFERRED EMBODIMENT

Applicant's instantly reversing switch circuit 20 includes a plug-in type connector 22 for connection of the switch circuit 20 to the starting capacitor 24 which is typically mounted in a capacitor housing (not shown) atop the bell housing of the motor and second plug-in connector 23 for connection to L1. The capacitor 24 may have another connector 26 in that same housing such that A-C lines L1 and L3 may be directly connected to connectors 23, 26, as shown. An overload relay 28 may be provided, as desired, to monitor the full load current of the motor during its operation and prevent damage to the motor through an overload condition, as is known in the art. A common terminal 31 at L2 provides a connection point between the A winding 32 and the B winding 34, either one of which may function as the start winding depending upon the connection of the A-C lines. As is apparent from the drawing, winding 32 is connected at all times when L1 and L2 are energized; and winding 34 is connected at all times when L3 and L2 are energized. Also, with L2 as common, the polarity of the connection and hence the direction of rotation changes depending upon whether L1 or L3 is energized. It is also readily apparent that applicant's switch circuit 20 is in series with either winding 32 or winding 34 and can effectively disconnect it from the circuit, depending upon whether L1 or L3 is energized, respectively.

Applicant's start switch circuit 20 includes triac 36 which is indicated as type #TR147D. A 3.3K ohm resistor 38 and 0.047 microfarad capacitor 40 are parallel connected with triac 36 to prevent inadvertent and undesired DV/DT switching of triac 36 upon initial energization. A 220 ohm resistor 42 provides voltage to a full wave bridge rectifier 44 comprised of diodes 46, as is known in the art. From the positive lead 48 of bridge 44, an SCR 50 is series connected with a 4.7 microfarad timing capacitor 52. SCR 50 is indicated as a type #C203D. A 150K ohm resistor 56 limits the current to the other branches of applicant's motor start switch circuit 20. These include a 10K ohm resistor 58 and a parallel connected 0.022 microfarad capacitor 60 and 18K ohm resistor 62 extending between the anode and gate of programmable unijunction transistor (PUT) 64. The gate lead 66 of SCR 50 is connected to the juncture 67 of capacitor 60 and resistor 62 and to the anode lead 68 of PUT 64. A diode 69 is connected between timing capacitor 52 and the anode 68 of PUT 64 to complete a discharge path therefor. A 12 volt zener diode 70 extends between the cathode 72 of PUT 64 and gate 74 of PUT 64. A latching capacitor 76 is parallel connected across PUT 64 and resistor 58 and has a value of 0.022 microfarads. As indicated by the dotted line, a PC board 78 can conveniently mount all of the circuit elements which comprise applicant's electronic switch circuit 20 for ease of installation.

DESCRIPTION OF OPERATION

Depending upon the lines that are energized, applicant's instantly reversing switch is in series with the start winding, the run winding being directly connected between the energized lines. Thus, when the triac is in a conductive state, voltage and current are applied to the start winding and when it goes into its non-conductive state, the start winding is effectively disconnected from the circuit. Presuming L1 and L2 are energized, A-C voltage is applied through the 3.3K ohm resistor and 220 ohm resistor to the full wave bridge which rectifies it and outputs full wave rectified D-C through the 150K ohm and 10K ohm resistor and into the gate lead of the SCR. This turns on the SCR which provides a conductive path from the output side of the full wave bridge to the 4.7 microfarad timing capacitor. As the SCR conducts only in one direction, the 4.7 microfarad capacitor charges up a voltage step each half cycle of rectified D-C until the voltage at the cathode of diode 69 reaches approximately 12½ volts. As the anode of the PUT is connected to the cathode of diode 69, and a 12 volt zener diode is connected to the gate of the PUT, 12½ volts at anode 68 provides a +½ volt PUT anode to gate voltage. When the anode to gate voltage of the PUT reaches approximately +½ volt, it fires to shunt the gate current of the SCR away from the gate lead, thereby turning off the SCR. As the current in the right hand portion of the circuit is limited by the 150K ohm resistor, turning off the SCR effectively eliminates the triggering current through the lower leg of the full wave bridge to the gate lead of the triac and switches it off. Thus, at this point, the start winding is disconnected from the circuit as the SCR and triac has been turned off.

As is apparent from the foregoing description, the time at which the SCR is turned off is dependent upon the circuit parameters for the 4.7 microfarad timing capacitor along with the selection of the voltage value for the 12 volt zener diode. Adjustment of these values will result in either shorter or longer switching times as desired, and as known in the art.

Once the SCR is turned off, the timing capacitor discharges very quickly through the diode and PUT and it is ready for the next timed start cycle. The 0.022 microfarad capacitor and 10K ohm resistor provide a cathode to anode current path which maintains the PUT in an on condition during the valleys of the full wave rectified D-C supplied from the bridge. Their circuit parameters are chosen to prevent decay of the cathode current during the relatively short time period between adjacent peaks of voltage and current, but to also permit current decay below the tunnel current of the PUT and achieve turn-off within approximately 16.4 milliseconds of the disconnection of power from the A-C lines L1 and L2. Changing the circuit parameters will effectively change the switching and reset time of the circuit and can be adjusted to provide shorter or longer intervals between cycles of the switch.

In an instantly reversing action, L1 would be effectively disconnected and L3 would be effectively connected, the interval therebetween being determined by the mechanical action of the contactor or other switch operating the motor. That interval is generally much larger than the 16.4 millisecond interval required to reset the switch with the circuit parameters as shown in the drawing. Thus, this circuit operates substantially instantaneously. Upon reconnection between L3 and L2, applicant's instantly reversing switch is in series with winding 32 which becomes the start winding, winding 34 being the run winding in this direction of rotation. Circuit operation is exactly the same for this connection because of the bi-polar nature of the triac and full wave bridge.

There are various changes and modifications which may be made to applicant's invention as would be apparent to those skilled in the art. However, any of these changes or modifications are included in the teaching of applicant's disclosure and he intends that his invention be limited only by the scope of the claims appended hereto.

I claim:

1. An electronic switching circuit to automatically disconnect a first winding of a two winding electric motor from an applied voltage after a predetermined time delay, said switching circuit having means to reset itself to provide timed disconnection of either winding upon re-connection of said motor, the timed disconnection means including a timing capacitor in circuit with an electronic switch, the reset means having means to operate said electronic switch and reset the charge level of said timing capacitor, said reset means including a second electronic switch in circuit with said first electronic switch, means to trigger said second electronic switch in response to the charge level of said timing capacitor, and a second capacitor in circuit with said second electronic switch to latch it on through the low voltage portion of a full wave rectified waveform.

2. The circuit of claim 1 wherein said reset means operates said electronic switch to reset said timing capacitor at the end of the predetermined time delay.

3. The circuit of claim 1 wherein said second electronic switch is connected to a control terminal of said first electronic switch so that operation of said second electronic switch shunts the control signal away from said first electronic switch.

4. The circuit of claim 1 wherein said second electronic switch is a PUT and said trigger means includes a fixed voltage source connected to the gate of said PUT, the reset means for the timing capacitor comprising a diode connected between said capacitor and the anode of said PUT.

5. The circuit of claim 4 wherein said fixed voltage source is a zener diode.

6. The circuit of claim 1 further comprising a full wave bridge rectifier to supply voltage to said timed disconnection means and reset means.

7. The circuit of claim 1 further comprising a PC board, said circuit being mounted in said PC board and having a plurality of plug-in type connectors, said PC board and circuit being adapted for mounting within the conduit box of a motor.

8. An electronic switching circuit to automatically disconnect a first winding, and then reset itself preparatory to disconnecting a second winding of a two winding electric motor in an instantly reversing mode of operation, said circuit providing timed disconnection for each winding, comprising a triac connected between the windings of said motor and a timed disconnection and reset means to control the switching of said triac, said timed disconnection and reset means including a full wave bridge rectifier connected between the gate and cathode of said triac, an SCR connected in series with a timing capacitor, said SCR and timing capacitor connected across said bridge, a PUT connected to the gate lead of said SCR with a zener diode connected between the gate and cathode of said PUT, and an RC circuit in series with said PUT.

9. The circuit of claim 7 further comprising a PC board, said circuit being mounted to said PC board and having a plurality of plug-in type connectors, said PC board and circuit being adapted for mounting within the conduit box of a motor.

* * * * *